(12) United States Patent
Rieker et al.

(10) Patent No.: US 12,417,448 B2
(45) Date of Patent: Sep. 16, 2025

(54) SYSTEM AND METHOD FOR REPORTING FOUND TRANSACTION CARD

(71) Applicant: Mastercard International Incorporated, Purchase, NY (US)

(72) Inventors: Joseph J. Rieker, Wentzville, MO (US); Steven J. Schmidt, Wentzville, MO (US)

(73) Assignee: Mastercard International Incorporated, Purchase, NY (US)

( * ) Notice: Subject to any disclaimer, the term of this patent is extended or adjusted under 35 U.S.C. 154(b) by 149 days.

(21) Appl. No.: 18/366,090

(22) Filed: Aug. 7, 2023

(65) Prior Publication Data
US 2025/0053958 A1  Feb. 13, 2025

(51) Int. Cl.
*G06Q 20/34* (2012.01)
*G06Q 20/20* (2012.01)

(52) U.S. Cl.
CPC ........... *G06Q 20/341* (2013.01); *G06Q 20/20* (2013.01)

(58) Field of Classification Search
CPC ..... G06Q 20/341; G06Q 20/20; G06Q 20/202
USPC ............................................. 235/380
See application file for complete search history.

(56) References Cited

U.S. PATENT DOCUMENTS

| | | | |
|---|---|---|---|
| 9,065,893 B2 | 6/2015 | Glaser | |
| 2008/0079581 A1* | 4/2008 | Price | G06Q 10/08 340/568.1 |
| 2015/0084745 A1* | 3/2015 | Hertz | H04W 4/12 340/10.3 |
| 2016/0239733 A1* | 8/2016 | Hertz | H04W 4/029 |

\* cited by examiner

*Primary Examiner* — Paultep Savusdiphol
(74) *Attorney, Agent, or Firm* — Hovey Williams LLP

(57) ABSTRACT

A found card notification system receives an interchange electronic advice message from a point-of-sale (POS) terminal associated with a merchant. The interchange electronic advice message includes an indicator of a misplaced transaction card, a primary account number (PAN) of the misplaced transaction card, and a merchant identifier that identifies the merchant. The system extracts the PAN from the interchange electronic advice message and identifies an issuer of the misplaced transaction card from the extracted PAN. The found card notification system transmits the interchange electronic advice message to the issuer of the misplaced transaction card in response to identifying the issuer of the misplaced transaction card.

6 Claims, 7 Drawing Sheets

SYSTEM AND METHOD FOR REPORTING FOUND TRANSACTION CARD

FIELD OF THE DISCLOSURE

The field of the disclosure relates generally to a found card notification system and, more particularly, to systems and methods for using the payment rails of an interchange network to notify an issuer that a misplaced transaction card has been found.

BACKGROUND OF THE DISCLOSURE

A lost transaction card can lead to significant financial and security risks for both the cardholder and the transaction card issuing bank. When a transaction card is lost, it is typically necessary for the cardholder to report the loss to the issuing bank. If a cardholder leaves his or her transaction card at a merchant, or loses his or her transaction card, the cardholder must retrace his or her steps to determine the last known location of their transaction card. Retracing his or her steps, however, may only provide an indication of the last place of use of the transaction card and not necessarily the location where the transaction card was lost. Furthermore, in many instances, the cardholder may not even realize that their transaction card has been lost until they attempt to use it and cannot find it, or until they notice unauthorized payment transactions appearing on the financial account associated with their transaction card. This delay in detection can provide fraudsters with ample time to exploit the transaction card and cause financial harm to the cardholder and/or the issuing bank.

Currently, there is no mechanism for a finder of the transaction card to easily report finding the lost transaction card, let alone returning the found transaction card to the cardholder. A finder of the transaction card is limited to contacting the issuing bank, for example, by calling the telephone number listed on the back of the transaction card. Upon receiving a report of a found transaction card, the issuing bank will typically cancel the transaction card and arrange for the transaction card to be returned. For example, the issuing bank may ask the finder to return the transaction card to the nearest bank branch. This process of reporting and returning a found transaction card requires the effort and time of the finder.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a found card notification system is provided. The system notifies an issuer that a misplaced transaction card has been found. The system includes one or more processors, and one or more memory devices. The memory devices store computer-executable instructions thereon, which when executed by the one or more processors, cause the one or more processors to receive, from a point-of-sale (POS) terminal associated with a merchant, an interchange electronic advice message. The interchange electronic advice message includes an indicator of a misplaced transaction card, a primary account number (PAN) of the misplaced transaction card, and a merchant identifier that identifies the merchant. The processors extract the PAN from the interchange electronic advice message and identify an issuer of the misplaced transaction card from the extracted PAN. Moreover, in response to identifying the issuer of the misplaced transaction card, the one or more processors transmit the interchange electronic advice message to the issuer of the misplaced transaction card.

In another aspect, a computer-implemented method for notifying an issuer that a misplaced transaction card has been found is provided. The method includes receiving, from a point-of-sale (POS) terminal associated with a merchant, an interchange electronic advice message. The interchange electronic advice message includes an indicator of a misplaced transaction card, a primary account number (PAN) of the misplaced transaction card, and a merchant identifier that identifies the merchant. The method also includes extracting the PAN from the interchange electronic advice message and identifying an issuer of the misplaced transaction card from the extracted PAN. Additionally, the method includes, in response to identifying the issuer of the misplaced transaction card, transmitting the interchange electronic advice message to the issuer of the misplaced transaction card.

In yet another aspect, a non-transitory computer-readable storage medium is provided. The computer-readable storage medium has computer-executable instructions stored thereon. The computer-executable instructions, when executed by one or more processors, cause the one or more processors to receive, from a point-of-sale (POS) terminal associated with a merchant, an interchange electronic advice message. The interchange electronic advice message includes an indicator of a misplaced transaction card, a primary account number (PAN) of the misplaced transaction card, and a merchant identifier that identifies the merchant. The computer-executable instructions also cause the one or more processors to extract the PAN from the interchange electronic advice message and identify an issuer of the misplaced transaction card from the extracted PAN. Moreover, the computer-executable instructions cause the one or more processors to transmit, in response to identifying the issuer of the misplaced transaction card, the interchange electronic advice message to the issuer of the misplaced transaction card.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Example Transaction Card Transaction Network

Figure 1:
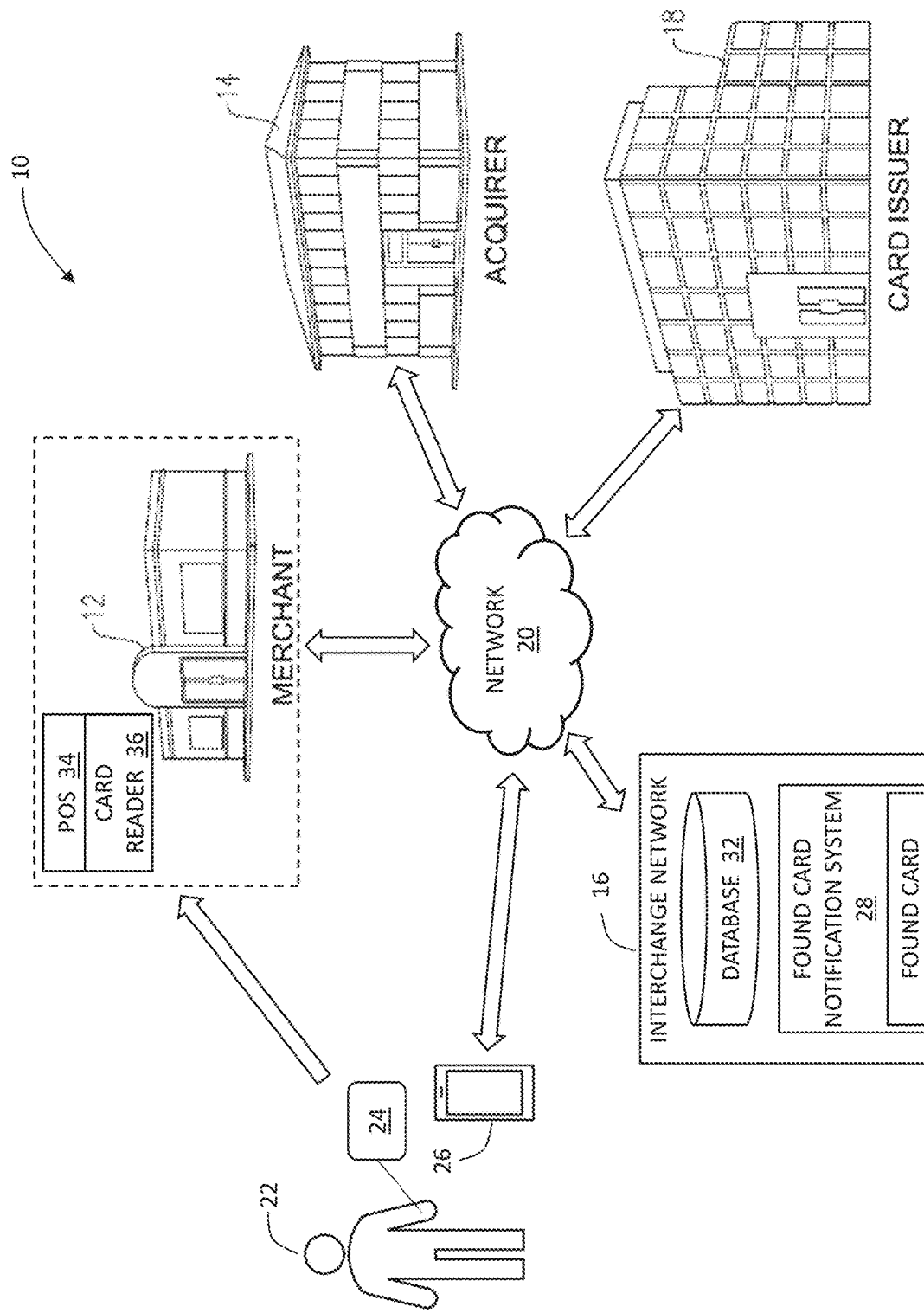
FIG. 1 is a block diagram of an exemplary payment network system that includes a found card notification system, in accordance with an aspect of the present invention.

FIG. 1 is a block diagram of an exemplary payment network system 10 that includes a found card notification system 28. One aspect of the payment network system 10 is referred to as "interchange." That is, the payment network system 10 facilitates providing transaction card interchange services offered by a transaction card interchange network 16 (broadly, an interchange network). In addition, the payment network system 10 enables transaction card transactions in which merchants 12, acquirers 14, and/or card issuers 18 do not need to have a one-to-one relationship. Although parts of the payment network system 10 are presented in one arrangement, other embodiments may include the same or different parts arranged otherwise, depending, for example, on authorization processes for purchase transactions, communication between computing devices, etc.

In the example embodiment, the payment network system 10 generally includes the merchants 12, the acquirers 14, the interchange network 16, and the issuers 18, coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and consumers, etc.

Embodiments described herein may relate to a transaction card system, such as a credit card payment system using the Mastercard® interchange network. (Mastercard is a registered trademark of MasterCard International Incorporated). The Mastercard interchange network is a set of proprietary communications standards promulgated by Mastercard International Incorporated for the exchange of financial transaction data and the settlement of funds between financial institutions that are members of Mastercard International Incorporated.

In the example embodiment, the payment network system 10 also includes a transaction card 24 and a user device 26. The user device 26 may be associated with a person who finds a transaction card, such as the transaction card finder 22.

In a typical transaction card system, a financial institution called the "issuer" issues a financial account and associated transaction card, such as the transaction card 24 (e.g., a credit card, debit, etc.), to a cardholder (not shown). The cardholder uses the transaction card 24 to tender payment for a purchase from the merchant 12. In an example embodiment, the merchant 12 is typically associated with products, such as goods and/or services, that are offered for sale and are sold to the cardholder. The merchant 12 includes, for example, a physical location and/or a virtual location. A physical location includes, for example, a brick-and-mortar store, etc., and a virtual location includes, for example, an Internet-based store-front.

To accept payment with the transaction card 24, the merchant 12 must normally establish an account with a financial institution that is part of the payment network system 10. This financial institution is usually called the "merchant bank," the "acquiring bank," or the acquirer 14. When the cardholder presents payment for a purchase with, for example, the transaction card 24, the merchant 12 requests authorization from the acquirer 14 for the amount of the purchase. Typically, the request is performed using a point-of-sale (POS) terminal, such as POS terminal 34, that reads the cardholder's account information from the transaction card 24 via a card reader 36. For example, the POS terminal 34 may read the account information from embossed characters, a magnetic stripe, or a chip (either via direct contact or wirelessly) on the transaction card 24 via the card reader 36. The POS terminal 34 communicates electronically with the transaction processing computers of the acquirer 14 to transmit the account information thereto. Alternatively, the acquirer 14 may authorize a third party to perform transaction processing on its behalf. In this case, the POS terminal 34 will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase is covered by the cardholder's available credit line. Based on these determinations, the request for authorization will be declined or accepted. If the request is accepted, an authorization code is issued to the merchant 12.

When a request for authorization is accepted, the available credit line of the cardholder's account is decreased. Normally, a charge for a transaction card transaction is not posted immediately to the cardholder's account because bankcard associations, such as Mastercard International Incorporated, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder cancels the transaction before it is captured, a "void" is generated. If the cardholder returns the goods after the transaction has been captured, a "credit" is generated. The interchange network 16 and/or the issuer 18 store(s) the transaction card information, such as, and without limitation, a type of merchant, a merchant identifier, a location where the transaction was completed, an amount of purchase, and a date and time of the transaction, in a database 32.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, user account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12.

Normally, an interchange fee is paid by the acquirer 14 to the issuer 18 with respect to a particular transaction, including "zero dollar" authorizations. The interchange fee is a fee charged by the interchange network 16 (such Mastercard) to the acquirer 14 for processing a transaction card transaction. These fees are typically expressed as a percentage of the transaction value, plus a flat fee per transaction. The interchange fee helps to cover the costs associated with processing the transaction, such as fraud prevention and data processing.

In some instances, the cardholder may inadvertently misplace the transaction card 24, for example, by leaving it behind at a merchant 12, or otherwise misplacing or losing the transaction card 24. Additionally, the cardholder may be unaware that he or she is not in possession of the transaction card 24 for a period of time. As such, the transaction card 24 may be found, for example, by the transaction card finder 22, which may be an individual or the merchant 12. The finder may report the transaction card 24 as being found.

The interchange network 16 includes the found card notification system 28, which is configured to analyze various data associated with the transaction card 24 and provide various information to one or more parties associated with the found transaction card 24, such as the merchant 12, the acquirer 14, and the issuer 18. The found card notification system 28 is a specially programmed computer system that enables the interchange network 16 to receive, store, and/or transmit data related to the transaction card 24. The found card notification system 28 includes a found card notification application 30. The found card notification application 30 facilitates communication between the found card notification system 28 and one or more card finders, such as the transaction card finder 22 and the merchant 12.

Exemplary Computer Systems

Figure 2:
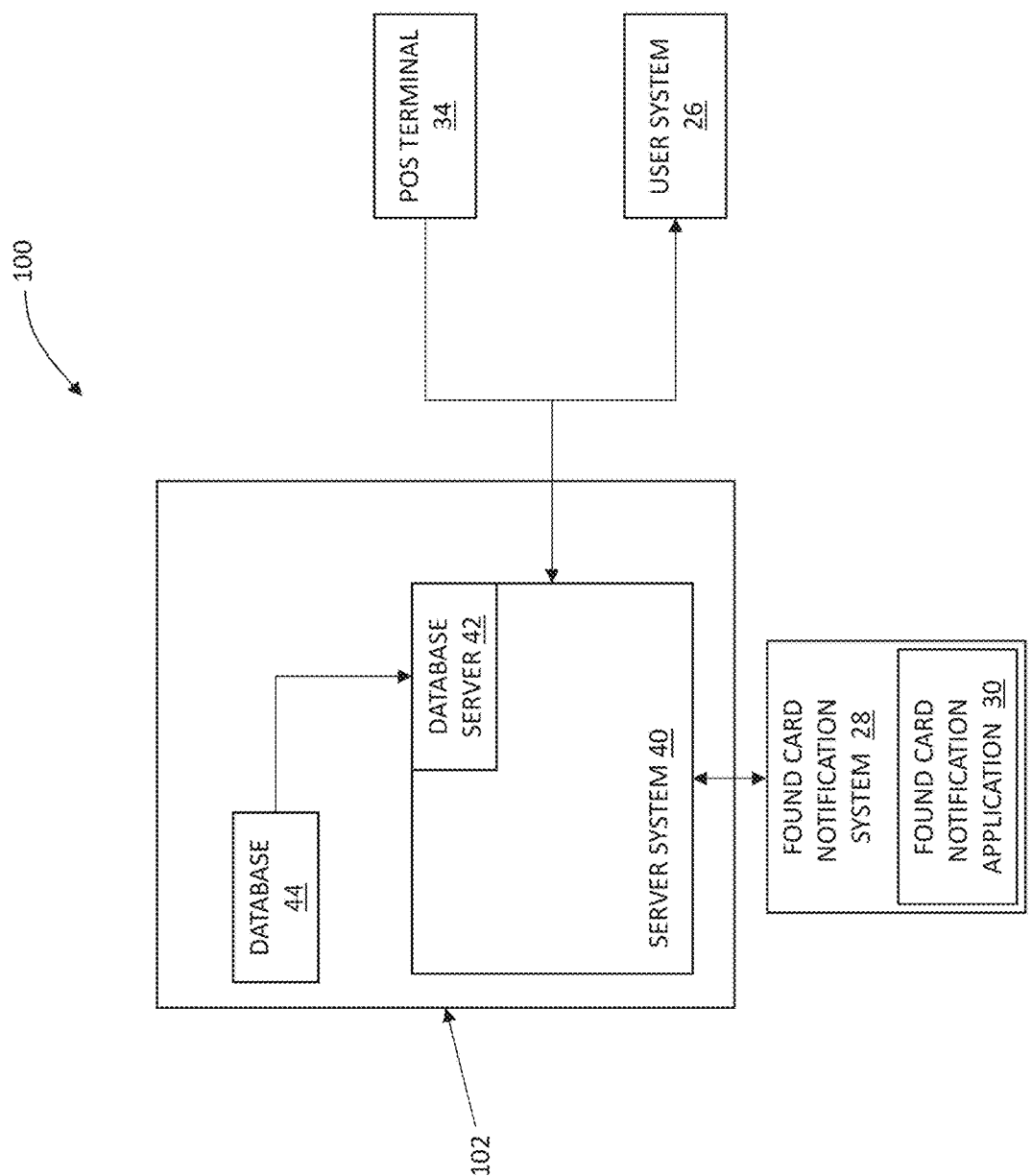
FIG. 2 is a simplified block diagram of an example payment network, including the found card notification system of FIG. 1.

FIG. 2 is a simplified block diagram of an example payment network 100 having transaction processing system 102 for providing a person or entity who finds a transaction card, such as the transaction card finder 22 or the merchant 12, access to the to the found card notification system 28, for example either directly or via the found card notification application 30.

In an embodiment, the payment network 100 is similar to the payment network system 10 (shown in FIG. 1). In the example embodiment, the payment network 100 includes a plurality of computing devices connected in accordance with the present disclosure. The payment network 100 includes a server system 40 of the processing system 102. The server system 40 is in communication with one or more POS terminals, such as the POS terminal 34. The POS terminal 34 may be located, for example, at the merchant 12 (shown in FIG. 1). The server system 40 is also in communication with at least one user device 26 associated with a user, such as the transaction card finder 22.

In an embodiment, the user device 26 is a mobile computing device, including a camera and a web browser. It is contemplated, however, that the user device 26 can be any device, such as a mobile phone, Smartphone, personal digital assistant (PDA), key fob, and/or a computer, such that the server system 40 is accessible to the user device 26 using the Internet. The user device 26 is interconnected to the Internet through one or more of many interface types including, for example, a network, such as a wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like. The user device 26 may be any device capable of interconnecting to the Internet including an Internet connected phone, or any other suitable web-based connectable equipment.

In the example embodiment, the processing system 102 includes at least one POS terminal 34, which may be connected to the server system 40. The POS terminal(s) 34 may be interconnected to the Internet (or any other network that allows the POS terminal(s) 34 to communicate as described herein) through many interfaces including a network, such as a local area network (LAN) or a wide area network (WAN), dial-in-connections, cable modems, wireless modems, and special high-speed ISDN lines. The POS terminal(s) 34 is any device capable of interconnecting to the Internet and including an input device capable of reading information from a cardholder's transaction card, such as the transaction card 24. In some embodiments, the POS terminal 34 may be a user's personal computing device, such as when conducting an online transaction through the Internet.

A database server 42 is connected to a database 44, which is configured to store information on a variety of matters. In one embodiment, the database 44 is a centralized database stored on the server system 40. The database 44 may be accessed by potential users at one of the user systems 26 by logging onto the server system 40 through one of the user systems 26. In an alternative embodiment, the database 44 is stored remotely from the server system 40 and may be a distributed or non-centralized database.

In one example embodiment, the database 44 may include a single database having separated sections or partitions or may include multiple databases, each being separate from each other. The database 44 may store transaction data generated as part of sales activities and savings activities conducted over the processing network. The stored transaction data may include data relating to merchants, account holders or customers, issuers, acquirers, savings amounts, savings account information, and/or purchases made. The database 44 may also store account data including at least one of a username, a user address, an account number, and other account identifier. The database 44 may also store merchant data including a merchant identifier that identifies each merchant registered to use the network, and instructions for settling transactions including merchant bank account information. The database 44 may also store purchase data associated with items purchased by a user from a merchant, and authorization request data. The database 44 may also store device information, a primary account number (PAN), a virtual PAN, "found card" status data, and other data associated with identifying a found transaction card, the finder, and a location of the found transaction card.

In the example embodiment, the user device 26 may be associated with the transaction card finder 22 (shown in FIG. 1). The POS terminal 34 may be associated with the merchant 12 (shown in FIG. 1), which may be the transaction card finder in some instances. The server system 40 may be associated with the interchange network 16 or a payment processor. In the example embodiment, the server system 40 is associated with a financial transaction processing network, such as the interchange network 16, and may be referred to as an interchange computer system. The server system 40 may be used for processing transaction data and/or "found card" data. In addition, the user device 26 and the POS terminal 34 may include a computer system associated with at least one of a merchant, an online bank, a bill payment outsourcer, an acquirer bank, an acquirer processor, an issuer bank associated with a transaction card, an issuer processor, a remote payment processing system, and/or a biller.

In the example embodiment, the processing system 102 is in communication with the found card notification system 28 and the found card notification application 30, which may be associated with the interchange network 16 or with an outside third party in a contractual relationship with the interchange network 16. In the example embodiment, the found card notification system 28 receives "found card" messages from the merchant 12 via the POS terminal 34 and/or an individual transaction card finder 22 via the user device 26. The found card notification system 28 also transmits "found card" messages to the issuer 18 associated with the found transaction card 24. Furthermore, the found card notification system 28 may update a transaction card record associated with the found transaction card 24 with a data element indicating that the status of the transaction card 24 is a "found card" not in possession of the cardholder.

In some embodiments, the found card notification system 28 and/or the found card notification application 30 are also in communication with a merchant system, an issuer system (not shown), and/or the POS terminal 34 of the merchant 12. It is noted that the payment network 100 may include more, fewer, or alternative components and/or perform more, fewer, or alternative actions, including those discussed elsewhere herein.

Figure 3:
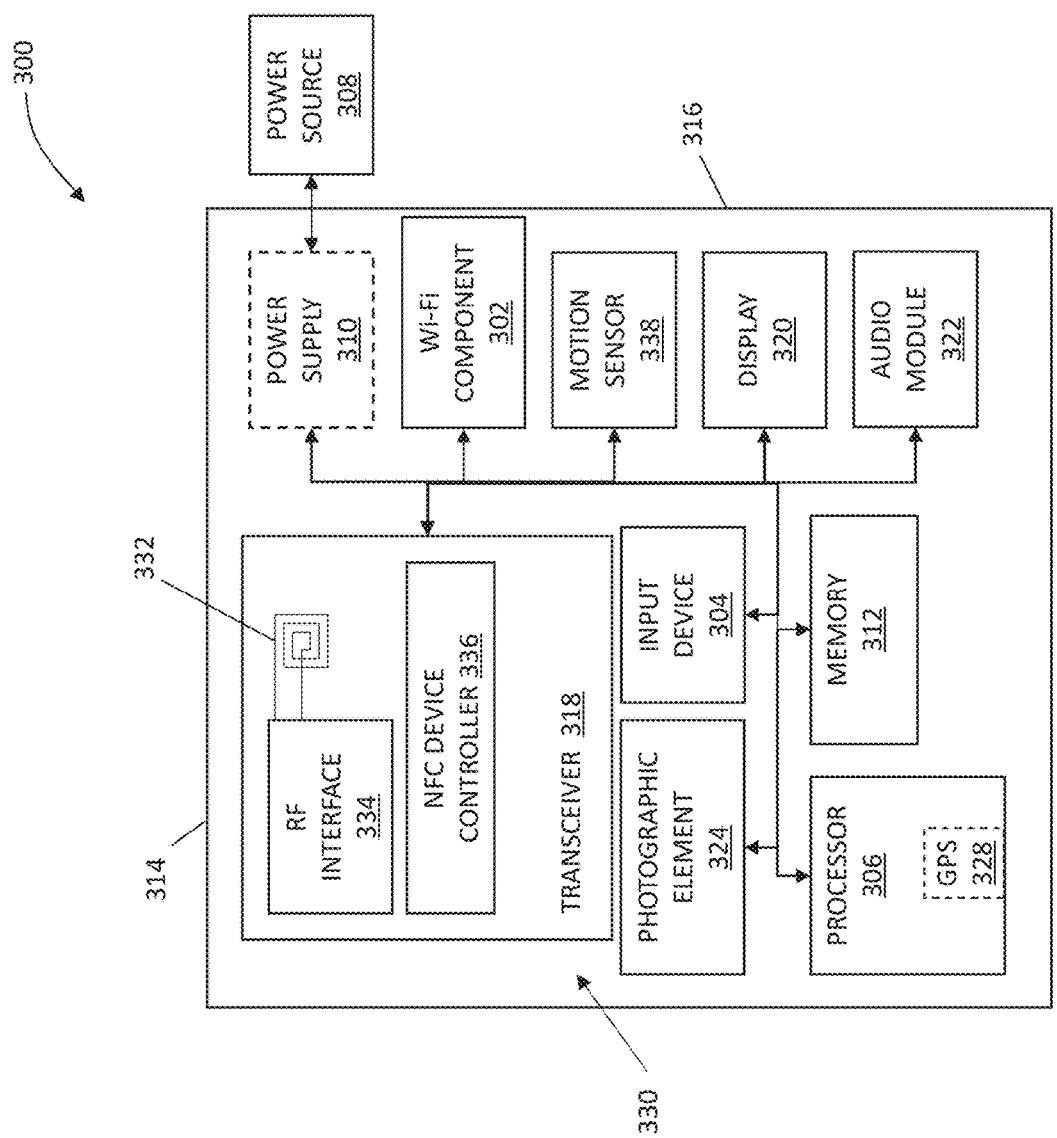
FIG. 3 is an example configuration of a user computing system operated by a user, such as a transaction card finder shown in FIG. 1.

FIG. 3 is an example configuration of a user computing system 300, such as the user device 26 (shown in FIG. 1) that may be operated by a user, such as an individual transaction card finder 22 (shown in FIG. 1). In the exemplary embodiment, the computing system 300 is a computing device configured to connect wirelessly to one or more of a POS terminal, such as the POS terminal 34, a merchant 12 computer, an interchange network 16 computer, an issuer 18 computer, the network 20, and any other computing devices.

In the exemplary embodiment, the computing system 300 generally includes a processor 306, a memory device 312, a transceiver 318 (or a wireless communication device), and a photographic element 324. In addition, the computing system 300 includes an integrated Wi-Fi component 302 (e.g., implementing the Institute of Electrical and Electronics/IEEE 802.11 family of standards), an input device 304, a display 320, and an audio module 322. Moreover, the computing system 300 optionally includes an internal power supply 310 (e.g., a battery or other self-contained power source) to receive power, or alternatively, in some embodiments, the computing system 300 may include an external power source 308. Optionally, the computing system 300 may include a motion sensor 338.

The processor 306 includes one or more processing units (e.g., in a multi-core configuration) specially programmed for executing computer readable instructions. The instructions may be executed within a variety of different operating systems (OS) on the computing system 300, such as UNIX, LINUX, Microsoft Windows®, etc. More specifically, the instructions may cause various data manipulations on data stored in the memory device 312 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 312 is any device allowing information such as transaction card data, the executable instructions, and/or other data to be stored and retrieved. The memory device 312 includes one or more computer readable media.

In the example embodiment, the processor 306 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 300 may be widely deployed, it may be impractical to manually update software for each computing system 300. Therefore, the payment network system 10 provides a mechanism for automatically updating the software on the computing system 300. For example, an updating mechanism may be used to automatically update any number of components and their drivers, both network and non-network components, including system level (OS) software components. In some embodiments, the computing system 300 components are dynamically loadable and unloadable; thus, they may be replaced in operation without having to reboot the OS.

A location of the computing system 300 can be obtained through conventional methods, such as a location service (e.g., global positioning system (GPS) service) in the computing system 300, "ping" data that includes geotemporal data, from cell location register information held by a telecommunications provider to which the computing system 300 is connected, and the like. For example, in one suitable embodiment, an optional GPS chip 328 can be part of or separate from the processor 306 to enable the location of the computing system 300 to be determined.

The Wi-Fi component 302 (broadly, a communication interface) may be communicatively connectable to a remote device such as the POS terminal 34, the network 20, and/or the server system 40. The Wi-Fi component 302 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 312 are, for example, computer readable instructions for providing a user interface to the user, such as the transaction card finder 22, via the display 320 and, optionally, receiving and processing input from the input device 304. A user interface may include, among other possibilities, a web browser and a client application, such as the found card notification application 30 hosted by the interchange network 16. Web browsers enable users, such as the transaction card finder 22, to view and interact with media and other information typically embedded on a web page or a website. A client application, such as the found card notification application 30, allows the transaction card finder 22 to interact with a server application, for example, associated with the interchange network 16 (e.g., the found card notification system 28).

The photographic element 324 may include a camera or other optical sensor and lens combination capable of generating a video signal and capturing an image, iris scan, and the like. In various embodiments, the photographic element 324 may be integrated in a housing or body, such as a housing 314, of the computing system 300. When the photographic element 324 captures an image or otherwise generates image data (e.g., video data), the photographic element 324 may store the image data in a data file, either in a raw or compressed format, in the memory device 312.

In some embodiments, the motion sensor 338 may include one or more sensor elements that facilitate detecting a person's presence. For example, the motion sensor 338 may detect when the user moves or raises the user consumer system 300. Upon detection of such motion, the photographic element 324 may begin capturing images (e.g., still or video images), the transceiver 318 may be activated, and/or the audio module 322 may begin capturing audio. The motion sensor 338 may be operatively coupled to the photographic element 324 such that the consumer's presence may be detected by detecting motion using the photographic element 324. The motion sensor 338 may include, for example, and without limitation, sensor elements such as a passive infrared sensor, an ambient light sensor, and the like.

In the example embodiment, the display 320 can include, for example, and without limitation, a liquid crystal display (LCD), an organic light emitting diode (OLED) display, or an "electronic ink" display. In some embodiments, a single component such as a touch screen may function as both an output device (e.g., the display 320) and the input device 304. As such, the display 320 may optionally include a touch controller for support of touch capability. In such embodiments, the computing system 300 may detect a user's presence by detecting that the user has touched the display 320 of the computing system 300.

The audio module 322 may include, for example, and without limitation, a speaker and related components capable of broadcasting streaming and/or recorded audio and may also include a microphone. The microphone facilitates capturing audio through the computing system 300.

In the example embodiment, the computing system 300 includes the housing 314 at least partly (and more preferably, at least substantially or entirely) enclosing the components described above. In addition, the computing system 300 includes circuitry 330 configured to communicate with the network 20 (shown in FIG. 1) and/or other computing devices (e.g., other mobile devices, the POS terminal 34, the interchange network 16, etc.). The circuitry 330 may include, for example, leads, connectors, NFC-enabled circuitry, Wi-Fi-enabled circuitry, and photographic element circuitry. The housing 314 is preferably configured to seal the circuitry 330, which is susceptible to degradation from the ambient environment. In one embodiment, the circuitry 330 is hermetically sealed in the housing 314. For example, in one embodiment, the circuitry 330 is completely and permanently encased within the housing 314. In other words, the housing 314 and the circuitry 330 are intended to remain as a single, inseparable unit throughout the life of the computing system 300. It is understood that the housing 314 can be formed separately from the circuitry 330 and that the circuitry 330 can be placed into and sealed within the housing 314 in a separate operation. It is also understood that the housing 314 can be oversized with respect to the circuitry 330 so that the circuitry 330 can be placed loosely into the housing 314. In another embodiment, the circuitry 330 can be selectively, sealingly enclosed within the housing 314, where the housing 314 includes a closure 316 removably attached to a body of the housing 314.

The housing 314 is fabricated from a suitably selected material that facilitates inhibiting the effect the material has on the signal being emitted from, for example, the transceiver 318 and/or the Wi-Fi component 302 and passing through the housing material. For example, and without limitation, suitable materials from which the housing 314 may be fabricated include polyethylene, propylene, isoprene, and butylenes (i.e., polyolefins). In other embodiments, the housing 314 is fabricated from any material that enables the computing system 300 to function as described herein, such as metals, etc.

In one embodiment, the transceiver 318 includes an antenna 332. The antenna 332 includes a looped wire configured to transmit radio signals when current flows through the looped wire. The antenna 332 is any size, shape, and configuration that is suitable for transmitting signals as described herein. For example, the antenna 332 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 332 generates a magnetic field when it vibrates at a selected frequency. Specifically, the antenna 332 is configured to vibrate at a frequency of about 13.56 MHz, which is suitable for use in a near field communication (NFC) system.

In the example embodiment, the antenna 332 transmits radio signals to and receives radio signals from other wireless-enabled computing devices, for example, another mobile device, merchant POS terminal 34, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 332 functions as an NFC component to send and receive signals. The antenna 332 is configured to transmit radio signals to NFC components positioned within the magnetic field of the antenna 332, such as when the computing system 300 is positioned within a predetermined distance of the POS terminal 34. Therefore, the magnetic field generated by the antenna 332 defines the active range of the computing system 300. Additionally, the antenna 332 receives radio signals from NFC components when the antenna 332 is positioned within the magnetic field of the NFC components.

The transceiver 318 also includes a radio frequency (RF) interface 334 and an NFC device controller 336. The RF interface 334 and the NFC device controller 336 are powered by the power source 308, and in some embodiments, the internal power supply 310 and/or the display 320. In addition, the processor 306 and the memory device 312 are powered in the same manner. The RF interface 334 is configured to receive and transmit RF signals through the antenna 332. The NFC device controller 336 is configured to process the received RF signals and to generate signals to be transmitted by the RF interface 334. The memory device 312 is configured to store data associated with transmitting and receiving the RF signals. The NFC device controller 336 is coupled in communication with the processor 306.

In some embodiments, the computing system 300 may be connected to one or more peripheral devices (not shown). That is, the computing system 300 may communicate various data with one or more peripheral devices. For example, the computing system 300 may communicate with one or more peripheral devices through the Wi-Fi component 302, the transceiver 318, or other suitable means.

Figure 4:
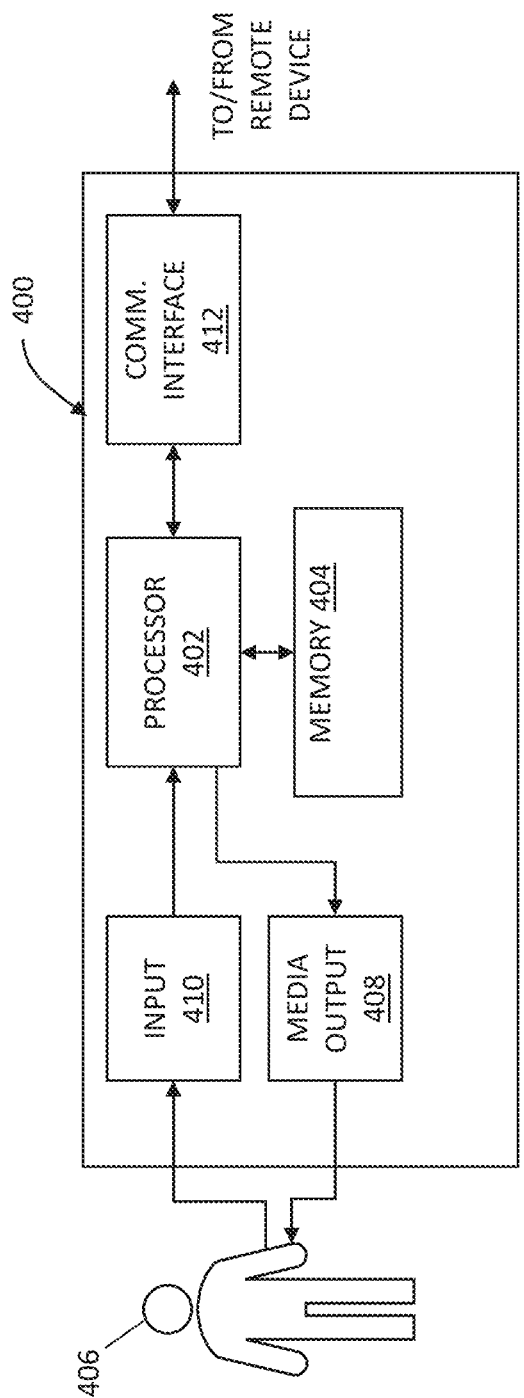
FIG. 4 is an example configuration of a computing system, such as the point-of-sale terminal shown in FIG. 1.

FIG. 4 is an example configuration of a computing system 400. In some embodiments, the computing system 400 is a merchant POS terminal 34 (shown in FIG. 2). In the example embodiment, the computing system 400 includes a processor 402 for executing instructions. In some embodiments, executable instructions are stored in a memory device 404. The processor 402 includes one or more processing units, for example, a multi-core configuration. The memory device 404 is any device allowing information such as executable instructions and/or other data to be stored and retrieved. The memory device 404 includes one or more computer readable media.

The computing system 400 also includes at least one media output component 408 for presenting information to the user 406. The media output component 408 is any component capable of conveying information to the user 406. In some embodiments, the media output component 408 includes an output adapter such as a video adapter and/or an audio adapter. An output adapter is operatively coupled to the processor 402 and operatively connectable to an output device such as a display device, such as a liquid crystal display (LCD), organic light emitting diode (OLED) display, or "electronic ink" display, or an audio output device, such as a speaker or headphones.

In some embodiments, the computing system 400 includes an input device 410 for receiving input from the user 406. The input device 410 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 408 and the input device 410. The computing system 400 may also include a communication interface 412, which is communicatively connectable to a remote device such as the server system 40 and/or the POS terminal 34 (shown in FIG. 2). The communication interface 412 may include, for example, a wired or wireless network adapter or a wireless data transceiver for use with Bluetooth communication, radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 404 are, for example, computer readable instructions for providing a user interface to the user 406 via the media output component 408 and, optionally, receiving and processing input from the input device 410. A user interface may include, among other possibilities, a web browser and various software applications, such as the found card notification application 30. Web browsers enable users, such as the user 406, to view and interact with media and other information typically embedded on a web page or a website, for example, from the server system 40. The various software applications allow the user 406 to interact with a server application, such as the found card notification application 30, from the server system 40 to facilitate receiving/providing various services.

Figure 5:
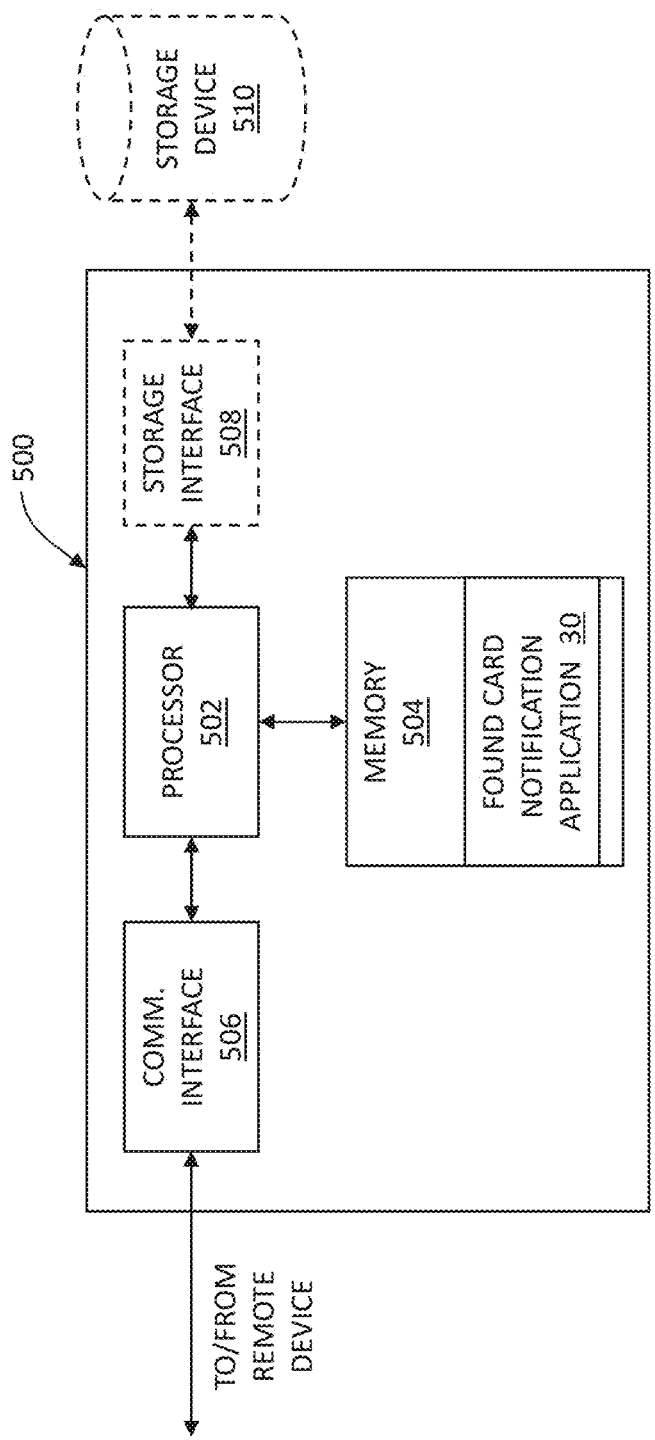
FIG. 5 is an example configuration of a server system, such as a server system shown in FIG. 2.

FIG. 5 is an example configuration of a server system 500, such as the server system 40 (shown in FIG. 2). The server system 500 includes, but is not limited to, the found card notification system 28 (shown in FIG. 1). In the example embodiment, the server system 500 includes a processor 502 for executing instructions. The instructions may be stored in a memory 504, for example. The processor 502 includes one or more processing units (e.g., in a multi-core configuration) for executing the instructions. The instructions may be executed within a variety of different operating systems on the server system 500, such as UNIX, LINUX, Microsoft Windows®, etc. More specifically, the instructions may cause various data manipulations on data stored in a storage device 510 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 502 is operatively coupled to a communication interface 506 such that the server system 500 can communicate with a remote device such as a user computing system 300 (shown in FIG. 3), a computing system 400 (shown in FIG. 4), and/or another server system 500. For example, the communication interface 506 may receive communications from a user device 26 via the Internet, as illustrated in FIG. 2.

The processor 502 is operatively coupled to the storage device 510. The storage device 510 is any computer-operated hardware suitable for storing and/or retrieving data. In some embodiments, the storage device 510 is integrated in the server system 500. In other embodiments, the storage device 510 is external to the server system 500 and is similar to the databases 32 (shown in FIG. 1) and/or 44 (shown in FIG. 2). For example, the server system 500 may include one or more hard disk drives as the storage device 510. In other embodiments, the storage device 510 is external to the server system 500 and may be accessed by a plurality of server systems 500. For example, the storage device 510 may include multiple storage units such as hard disks or solid-state disks in a redundant array of inexpensive disks (RAID) configuration. The storage device 510 may include a storage area network (SAN) and/or a network attached storage (NAS) system.

In some embodiments, the processor 502 is operatively coupled to the storage device 510 via a storage interface 508. The storage interface 508 is any component capable of providing the processor 502 with access to the storage device 510. The storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 502 with access to the storage device 510.

The memory 504 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In an embodiment, the memory 504 includes the found card notification application 30 stored thereon, which when executed by the processor 502, enables the server system 500 to handle found transaction card transactions from users, such as an individual transaction card finder 22 and/or the merchant 12 (each shown in FIG. 1), to identify and flag a transaction card as being found and to notify the associated issuer 18 of the found status of the transaction card.

In the example embodiment, server system 500 is the found card notification system 28, coupled in communication with one or more of the user device 26, the interchange network 16, and/or the merchant 12 during a "found card" transaction involving a found transaction card, such as the transaction card 24.

Exemplary Computer-Implemented Methods

Figure 6:
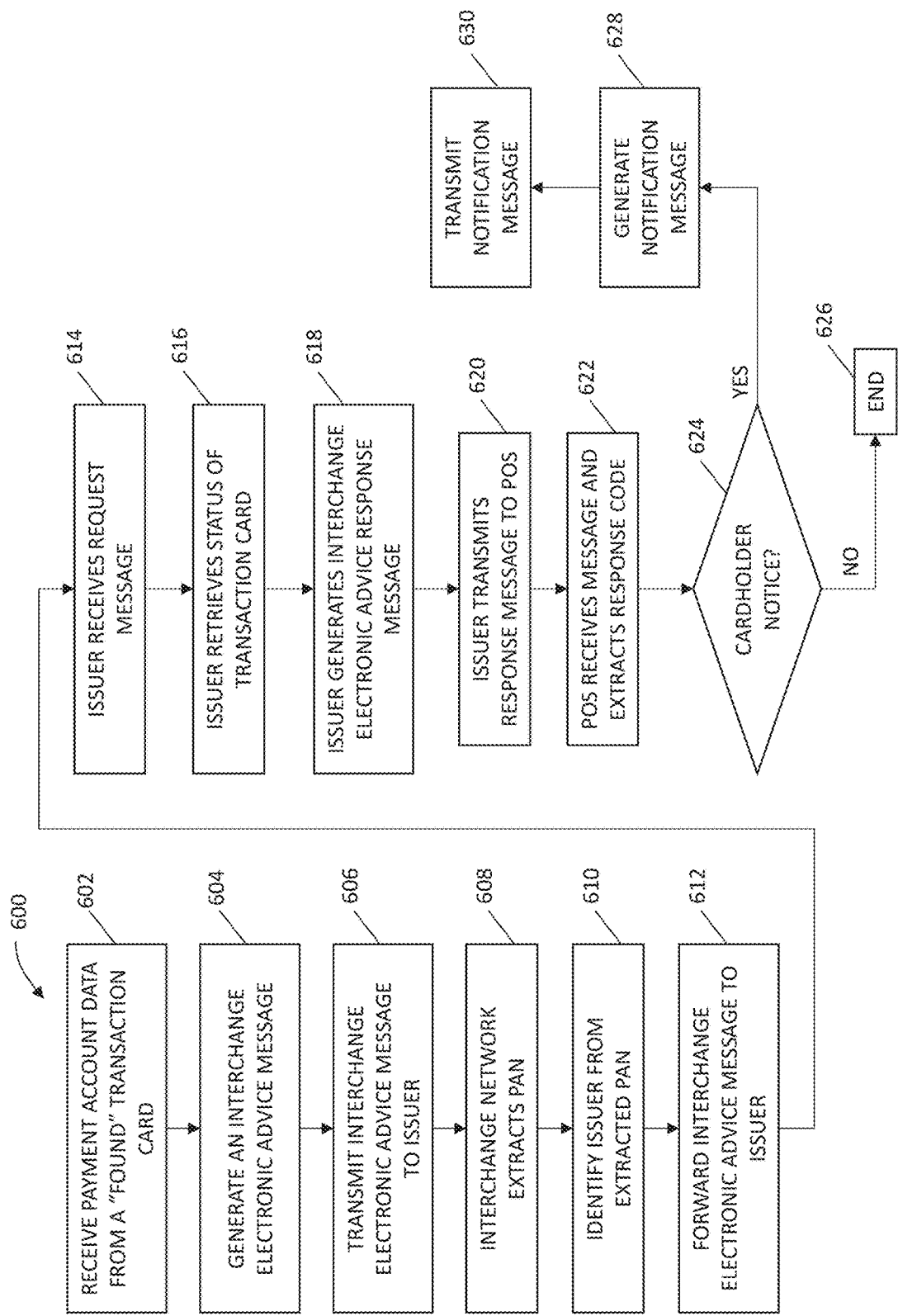
FIG. 6 is a flowchart illustrating an exemplary computer-implemented method for notifying an issuer of a lost transaction card that the transaction card has been found and is in the possession of a merchant, in accordance with one embodiment of the present disclosure.

FIG. 6 is a flowchart illustrating an exemplary computer-implemented method 600 for notifying an issuer of a lost transaction card that the transaction card has been found and is in the possession of a merchant, in accordance with one embodiment of the present disclosure. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-5. In one embodiment, the computer-implemented method 600 is implemented by the merchant POS terminal 34 (shown in FIGS. 1 and 2) and the found card notification system 28. In the exemplary embodiment, the computer-implemented method 600 relates to performing a "found card" transaction associated with a transaction card, such as the transaction card 24 (shown in FIG. 1). While operations within the computer-implemented method 600 are described below regarding the merchant POS terminal 34 and the found card notification system 28, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

As described herein, a cardholder (not shown) may inadvertently misplace his or her transaction card, such as the transaction card 24, by leaving it behind at a merchant 12, or otherwise misplacing or losing the transaction card 24. The cardholder may be unaware that he or she is not in possession of the transaction card 24. As such, the transaction card 24 may be found, for example, by the merchant 12 before the transaction card is even known to be missing. In some instances, the merchant 12 may find and report the transaction card 24 to the issuer 18 as being found.

In the example embodiment, the merchant 12 participates in the payment network system 10 and has responsibilities to the payment network system 10. As such, the merchant 12 is unlikely to misuse a found transaction card 24. The merchant 12 may also be able to secure the found transaction card 24 until the cardholder is able to return to the merchant 12 and retrieve his or her card. As such, if the issuer 18 is notified that a merchant, such as the merchant 12, has found and is in possession of the transaction card 24, the issuer 18 can notify the cardholder of the location of the transaction card 24 and keep the transaction card active. As such, the transaction card will not need to be canceled and replaced.

In the example embodiment, at operation 602, a POS terminal, such as the POS terminal 34 belonging to the merchant 12 (shown in FIG. 1), receives payment account data from a "found" transaction card, such as the transaction card 24. In the exemplary embodiment, the payment account data includes, for example, a primary account number (PAN), which corresponds to a transaction card account associated with a cardholder's financial account at the issuer 18. When the found transaction card 24 is swiped, dipped, or tapped at the POS terminal 34, for example, by an employee of the merchant 12, the POS terminal 34 reads the PAN from the transaction card 24 via the card reader 36 (shown in FIG. 1). The PAN may be printed or embossed on the transaction card 24, and/or stored in a magnetic stripe or a memory device of the transaction card 24. A PAN is typically eight (8) to nineteen (19) digits long and includes several fields reserved for particular uses. For example, when following the International Organization for Standardization (ISO) standards, the first six (6) digits of the PAN are referred to as an Issuer Identification Number (IIN) or Bank Identification Number (BIN), the first ($1^{st}$) digit of which is a Major Industry Identifier (MII). The IIN or BIN identifies the institution (i.e., the issuer 18) that issued the transaction card 24 to the cardholder. The following field, which may be of a variable length, identifies an individual account. A single check digit typically occupies the last digit of the PAN.

In the exemplary embodiment, swiping the transaction card 24 involves passing the magnetic strip past a magnetic stripe reader/writer of the card reader 36 of the POS terminal 34. Dipping of the transaction card 24 involves placing the transaction card 24 adjacent a chip reader of the card reader 36, for example, by inserting the transaction card 24 into a slot (not shown) defined in a housing of the POS terminal 34, such that a chip (or micromodule) of the card is in contact with the chip reader. Furthermore, tapping the transaction card 24 at the POS terminal 34 involves placing the transaction card 24 within a predetermined distance of the POS terminal 34, such that a magnetic field generated by card reader 36 can receive radio signals from the transaction card 24.

At operation 604, the POS terminal 34 generates an interchange electronic advice message, such as an Administrative Request Advice Message. The Administrative Request Advice Message includes the PAN of the transaction card 24, a merchant identifier that identifies the merchant 12, and an indicator that the associated transaction card (or PAN) is associated with a misplaced transaction card, i.e., a "found" card (broadly, "found card transaction data"). A "found" card is a misplaced transaction card that the merchant 12 has in its possession but does not know to whom the card belongs. Typical interchange electronic advice messages may be formatted pursuant to one or more standards, such as the International Organization of Standardization ISO 8583 standard, and may include a plurality of data elements, where each data element (DE) may be configured to store transaction card data as set forth in the associated standards. The data elements may include, for example, a data element configured to store the PAN, a data element configured to store the merchant identifier, a data element (the indicator) configured to store administrative (free format) textual data, wherein the textual data includes information indicating that the transaction card is a found card, etc. The interchange electronic advice messages may also include a message type indicator, which may be indicative of a type of the interchange electronic advice message. In some instances, an electronic transaction message may also include a bitmap, which may indicate the data elements included in the electronic transaction message and the data stored therein. In the example embodiment, the interchange electronic advice message is an ISO 8583 message type identifier (MTI) "0600" Administrative Request message (i.e., an Administrative Request/0600 message).

In one embodiment, the Administrative Request/0600 message contains customer data in DE 113-119 (Reserved for National Use) and the type of usage in DE 60 (Advice Reason Code). Any eligible Administrative Request/0600 message is routed by the interchange network 16 to the issuer 18 associated to the PAN account range within DE 2 (PAN) and the appropriate response timer is set for an issuer response message.

At operation 606, the POS terminal 34 transmits the interchange electronic advice message to a card issuer associated with the transaction card, such as the card issuer 18 (shown in FIG. 1), for example, via a payment network (e.g., the interchange network 16 (shown in FIG. 1)) for processing. In particular, the POS terminal 34 transmits the interchange electronic advice message to the acquirer 14 and the acquirer 14 forwards the interchange electronic advice message to the interchange network 16.

At operation 608, at the interchange network 16, the found card notification system 28 extracts the PAN from the Administrative Request/0600 message. At operation 610, the found card notification system 28 identifies the issuer 18 from the PAN, and, in response to identifying the issuer, forwards the interchange electronic advice message to the issuer 18 (operation 612) via the interchange network 16. Furthermore, as discussed herein, in response to receiving the Administrative Request/0600 message, in an embodiment, the interchange network 16, via the found card notification system 28, may update a transaction card record associated with the found transaction card 24 with a data element indicating that the status of the transaction card 24 is a "found card" not in possession of the cardholder (or owner of the misplaced transaction card).

At operation 614, the card issuer 18 receives the interchange electronic advice message (e.g., the Administrative Request/0600 message) including the found card transaction data from the interchange network 16. At operation 616, based on the PAN contained in the Administrative Request/0600 message, the card issuer 18 retrieves a status of the transaction card 24, for example, from a transaction card database. For example, and without limitation, in one embodiment, a cardholder may have reported his or her transaction card 24 as being lost or stolen. In such an instance, the transaction card database contains a status indicator indicating that the transaction card 24 should be captured or picked up (or otherwise disabled) by the merchant 12. Alternatively, the transaction card database may indicate that the transaction card is active. The issuer 18 may lock the transaction card and update the status of the transaction card as being found by the merchant 12 identified by the merchant identifier in the Administrative Request/0600 message. The merchant may notify the cardholder that the merchant 12 has his or her transaction card and is holding it for the cardholder's retrieval.

At operation 618, the issuer 18 generates an interchange electronic response advice message, such as an Administrative Request Response Advice Message. The Administrative Request Response Advice Message may include a status response code (i.e., the status identifier) indicating that the transaction card 24 is a lost card and is locked. The message may also include one or more instructions to the merchant 12. The instructions may include, for example, a message to retain the card for cardholder retrieval, or to destroy the card. These instructions are only exemplary. In a preferred embodiment, the interchange electronic response advice message is an ISO 8583 message type identifier (MTI) "0610" Administrative Request Response message (i.e., an Administrative Request Response/0610 message). The Administrative Request Response/0610 message may include, for example, a data element 39 (DE 39) response codes of 41 (Lost Card), which indicates that the transaction card is to be held or captured by the merchant 12.

In addition, in certain embodiments of the present disclosure, the MTI 0610 message may include one or more new response codes (e.g., DE 39 response codes), other new or existing data elements, and/or other forms of communication to the POS terminal 34 indicating that the transaction card 24 is to be held or captured. That is, the "held" or "captured" terminology, as used herein, is not limited to the existing response codes.

In the exemplary embodiment, in response to the Administrative Request/0600 message, at operation 620, the issuer 18 transmits the interchange electronic response advice message to the merchant 12, and more particularly, to the POS terminal 34 for example, via a payment network (e.g., the interchange network 16 (shown in FIG. 1)). In particular, the issuer 18 transmits the interchange electronic response advice message to the interchange network 16; the interchange network 16 forwards the interchange electronic response advice message to the acquirer 14; and the acquirer 14 forwards the interchange electronic response advice message to the POS terminal 34.

At operation 622, the POS terminal 34 receives and parses the interchange electronic response advice message to extract the status response code and instructions. As described herein, in the exemplary embodiment, the MTI 0610 received by the POS terminal 34 indicates that the transaction card 24 is to be held or destroyed.

In some embodiments, at operation 624, the issuer 18 determines whether the cardholder has selected to receive a notification message corresponding to selected types of transactions, such as "found card" transactions. In some embodiments, the cardholder may select to receive one or more notification messages of transactions associated with his or her account including, "found card" transactions with a status response code indicating that the transaction card 24 is to be held by a merchant 12. In one suitable example, the issuer 18 confirms whether the cardholder selected to receive a notification. If the cardholder did not select to receive a notification message, the process ends at operation 626.

At operation 628, if the cardholder selected to receive a notification message corresponding to "found card" transactions, the issuer 18 generates a corresponding notification message of the found transaction card. In the exemplary embodiment, the notification message may be generated in real time or near real time. As used herein, the term "real time" includes the time of occurrence of the associated events, the time to process data, and/or the time of a system response to the events and the environment. In the embodiments described herein, these activities and events occur substantially instantaneously.

The notification message is generated in a format that can be received by and presented to the cardholder, for example, on a cardholder mobile device and/or a cardholder computer system (both not shown). The notification message sent to a mobile device may be in a particular format and may conform to requirements defined by a mobile network operator. For example, and without limitation, a mobile network operator may specify that an SMS message has limitations on a number of characters and/or a pre-determined memory size (e.g., bits, bytes, etc.).

At operation 630, the issuer 18 transmits the notification message to the cardholder. In particular, the issuer 18 may transmit the notification message to a cardholder mobile device via a preferred method of delivery selected by the cardholder. In some embodiments, the preferred method of delivery may include, for example, and without limitation, the form of a push notification, an interactive voice response (IVR), an instant message (IM), an SMS message, a voicemail message, an email message, a web-based application message (e.g., via a payment application at the cardholder's mobile device, etc.), or any other suitable message form transmitted to the cardholder's mobile device and/or the cardholder's computer system. It should be understood that other notification message content and/or different delivery methods may be defined by the cardholder. Further, it should be understood that the issuer 18, for example, may provide the cardholder additional modes of notification messages, such as audio notifications, that enable the method 600 to function as described herein.

After the cardholder retrieves his or her transaction card 24 from the merchant 12, the cardholder may notify the issuer 18 and have the transaction card 24 unlocked. In response to unlocking (or reactivating) the transaction card 24, the issuer 18 transmits a second interchange electronic advice message to the interchange 16 indicating that the transaction card 24 has been returned to the cardholder. In response to the second interchange electronic advice message, the interchange network 16, via the found card notification system 28, may update a transaction card record associated with the transaction card 24 to remove the data element indicating that the status of the transaction card 24 as a "found card" not in possession of the cardholder (or owner of the misplaced transaction card).

Figure 7:
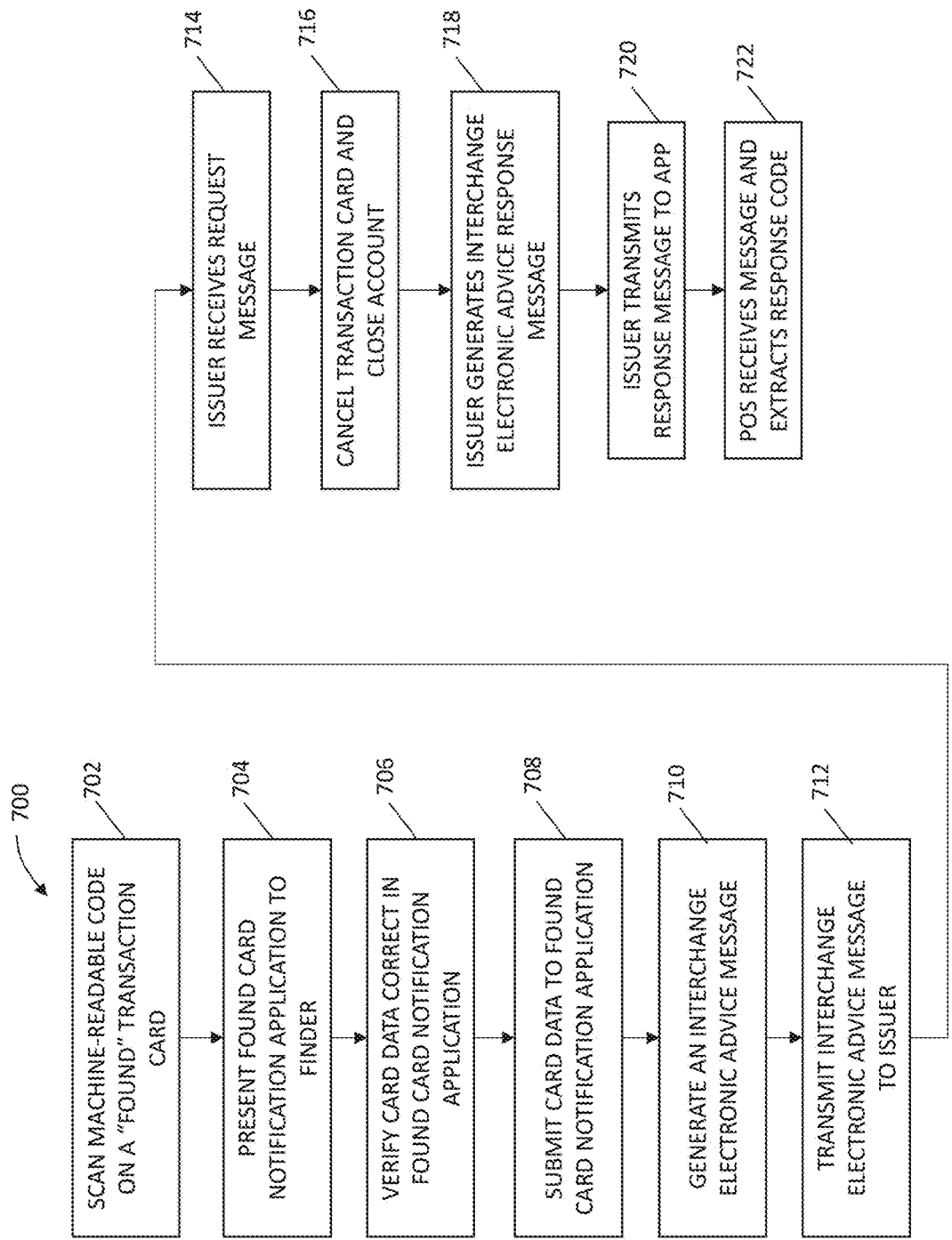
FIG. 7 is a flowchart illustrating an exemplary computer-implemented method for notifying an issuer of a lost transaction card that the transaction card has been found and is in the possession of a finder or a merchant, in accordance with one embodiment of the present disclosure.

FIG. 7 is a flowchart illustrating an exemplary computer-implemented method 700 for notifying an issuer of a lost transaction card that the transaction card has been found and is in the possession of a finder or merchant, in accordance with one embodiment of the present disclosure. The operations described herein may be performed in the order shown in FIG. 7 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 700 is described below, for ease of reference, as being executed by exemplary devices and components introduced with the embodiments illustrated in FIGS. 1-5. In one embodiment, the computer-implemented method 700 is implemented by the user device 26 (shown in FIGS. 1 and 2). In the exemplary embodiment, the computer-implemented method 700 relates to performing a "found card" transaction associated with a transaction card, such as the transaction card 24 (shown in FIG. 1). While operations within the computer-implemented method 700 are described below regarding the user device 26, according to some aspects of the present invention, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

As described herein, a cardholder (not shown) may inadvertently misplace or lose his or her transaction card, such as the transaction card 24. The cardholder may be unaware that he or she is not in possession of the transaction card 24. As such, the transaction card 24 may be found, for example, by the transaction card finder 22 before the transaction card is even known to be missing. In some instances, the transaction card finder 22 may report the transaction card 24 to the issuer 18 as being found.

In the embodiment depicted in FIG. 7, at operation 702, the transaction card finder 22 scans a machine-readable code (e.g., a bar code, quick response (QR) code, and the like) printed or otherwise presented on the transaction card 24 with the user device 26, for example, using a camera of the device. In one embodiment, the machine-readable code displayed on the transaction card 24 is a QR code. A QR code is a two-dimensional barcode or matrix barcode that is defined by the international standard ISO/IEC 18004:2015. A QR code includes three distinctive marks at different corners of the QR code image and one or more smaller marks proximate a fourth corner to normalize the image for size, orientation, and angle of viewing. In addition, dispersed within the four corners of the QR code are a plurality of small dots that can be converted to binary numbers and validated with an error-correcting algorithm. The binary number includes data that is encoded within the QR code. In one suitable embodiment, the data encoded in the QR code includes a virtual PAN, a PAN, or other token associated with a financial account. While the machine-readable code described herein is in reference to a QR code, the disclosure contemplates that any type of machine-readable code may be used that enables the payment network system 10 to function as described herein. For example, the machine-readable code may include one or more of one dimensional barcode formats, such as a UPC, code 39, EAN 8, or EAN 13, other two-dimensional formats such as PDF417 or Datamatrix, other n-dimensional barcode formats, and/or alphanumeric text or symbols or the like.

In the exemplary embodiment, after scanning the machine-readable code, at operation 704, the user device 26 opens a web browser presenting the found card notification application 30 of the found card notification system 28. In the exemplary embodiment, one or more data fields are automatically populated with the card details and presented to the transaction card finder 22. Optionally, the card notification application 30 may include one or more empty data fields that are configured to receive transaction card information, such as a name on the card, the card number, etc.

At operation 706, the transaction card finder 22 verifies that the information included in the data fields is correct. Optionally, the transaction card finder 22 may first input the transaction card details into the one or more data fields and then verify the information is correct. If correct, at operation 708, the transaction card finder 22 may submit the information to the card notification application 30 of the found card notification system 28.

At operation 710, the card notification application 30 generates an interchange electronic advice message, such as the Administrative Request/0600 message discussed above with respect to method 600. In this manner, the card notification application 30 functions substantially similar to the POS terminal 34.

At operation 712, the card notification application 30 transmits the interchange electronic advice message to a card issuer associated with the transaction card, such as the card issuer 18 (shown in FIG. 1), for example, via the payment network (e.g., the interchange network 16 (shown in FIG. 1)) for processing, substantially in the same manner as described above in method 600.

At operation 714, the card issuer 18 receives the interchange electronic advice message (e.g., the Administrative Request/0600 message) including the found card transaction data from the interchange network 16. At operation 716, based on the PAN contained in the Administrative Request/0600 message, and the merchant identifier (which, in this instance, indicates that the request message was submitted by the finder 22 via the application 30), the card issuer 18 may cancel the card and close the account. The issuer 18 may notify the cardholder that his or her transaction card 24 was found and reported to the issuer 18. The issuer 18 may also notify the cardholder that the transaction card 24 is canceled.

At operation 718, the issuer 18 generates an interchange electronic response advice message, such as the Administrative Request Response/0610 message discussed above. The Administrative Request Response/0610 message may include a status response code (i.e., the status identifier) indicating that the transaction card 24 is a lost card and is canceled. The message may also include instructions to the transaction card finder 22 to destroy the transaction card 24. This message may also include a text string thanking the transaction card finder 22 for reporting finding the transaction card 24.

In the exemplary embodiment, at operation 720, the issuer 18 transmits the interchange electronic response advice message to the transaction card finder 22, and more particularly, to the card notification application 30 for example, via the interchange network 16 (shown in FIG. 1). At operation 722, the card notification application 30 receives and parses the interchange electronic response advice message to extract the instructions and present them to the transaction card finder 22, for example, via the user device 26. The issuer 18 may then notify the cardholder as described above in method 600.

As is understood from the above-described systems and methods, the transaction card finder 22 (or merchant 12) can report finding a lost transaction card via the payment rails of interchange network 16. In this manner, the card issuer 18 and the cardholder may be apprised of the missing transaction card before either is even aware that the transaction card is missing. Because the systems and methods described use the payment rails of the interchange network 16, no private personal information is required by any of the parties to report and/or recover a lost transaction card.

Additional Considerations

All terms used herein are to be broadly interpreted unless otherwise stated. For example, the term "transaction card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "user" may refer to the owner or rightful possessor of a transaction card. As used herein, the term "user account" may refer specifically to a PAN or more generally to an account a user has with the transaction card issuer and that the PAN is or was associated with. As used herein, the term "merchant" may refer to a business, a charity, or any other entity that can generate transactions with a user account through a transaction card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A found card notification system for notifying an issuer that a misplaced transaction card has been found, the system comprising:
   one or more processors; and
   one or more memory devices storing computer-executable instructions thereon, which when executed by the one or more processors, cause the one or more processors to:
      receive, from a point-of-sale (POS) terminal associated with a merchant, a first interchange electronic advice message conforming to ISO 8583, including message type indicator (MTI) 0600, the first interchange electronic advice message including an indicator of a misplaced transaction card, a primary account number (PAN) of the misplaced transaction card, and a merchant identifier that identifies the merchant;
      extract the PAN from the interchange electronic advice message;
      identify an issuer of the misplaced transaction card from the extracted PAN;
      in response to identifying the issuer of the misplaced transaction card, transmit the first interchange electronic advice message to the issuer of the misplaced transaction card;
      receive, from the issuer, an interchange electronic response advice message conforming to ISO 8583, including message type indicator (MTI) 0610;
      in response to receiving the interchange electronic response advice message, update a transaction card record associated with the misplaced transaction card with a data element indicating the status of the misplaced transaction card as "found" or "returned;"
      receive, from the issuer, a second interchange electronic advice message conforming to ISO 8583, including message type indicator (MTI) 0600, the message including an indication that the misplaced transaction card has been returned to the cardholder; and
      in response to receiving the second interchange electronic advice message, update the transaction card record associated with the misplaced transaction card, including removing the data element.

2. The found card notification system in accordance with claim 1,
   said computer-executable instructions causing the one or more processors to transmit the interchange electronic response advice message to the POS terminal associated with the merchant.

3. A computer-implemented method for notifying an issuer that a misplaced transaction card has been found, the method comprising:
   receiving, from a point-of-sale (POS) terminal associated with a merchant, a first interchange electronic advice message conforming to ISO 8583, including message type indicator (MTI) 0600, the first interchange electronic advice message including an indicator of a misplaced transaction card, a primary account number (PAN) of the misplaced transaction card, and a merchant identifier that identifies the merchant;
   extracting the PAN from the interchange electronic advice message;
   identifying an issuer of the misplaced transaction card from the extracted PAN;
   in response to identifying the issuer of the misplaced transaction card, transmitting the first interchange electronic advice message to the issuer of the misplaced transaction card;
   receiving, from the issuer, an interchange electronic response advice message conforming to ISO 8583, including message type indicator (MTI) 0610;
   in response to receiving the interchange electronic response advice message, updating a transaction card record associated with the misplaced transaction card with a data element indicating the status of the misplaced transaction card as "found" or "returned;"
   receiving, from the issuer, a second interchange electronic advice message conforming to ISO 8583, including message type indicator (MTI) 0600, the message including an indication that the misplaced transaction card has been returned to the cardholder; and
   in response to receiving the second interchange electronic advice message, updating the transaction card record associated with the misplaced transaction card, including removing the data element.

4. The computer-implemented method in accordance with claim 3, further comprising transmitting the interchange electronic response advice message to the POS terminal associated with the merchant.

5. A non-transitory computer-readable storage medium having computer-executable instructions stored thereon, the computer-executable instructions, when executed by one or more processors, causing the one or more processors to:
- receive, from a point-of-sale (POS) terminal associated with a merchant, a first interchange electronic advice message conforming to ISO 8583, including message type indicator (MTI) 0600, the first interchange electronic advice message including an indicator of a misplaced transaction card, a primary account number (PAN) of the misplaced transaction card, and a merchant identifier that identifies the merchant;
- extract the PAN from the interchange electronic advice message;
- identify an issuer of the misplaced transaction card from the extracted PAN;
- in response to identifying the issuer of the misplaced transaction card, transmit the first interchange electronic advice message to the issuer of the misplaced transaction card;
- receive, from the issuer, an interchange electronic response advice message conforming to ISO 8583, including message type indicator (MTI) 0610;
- in response to receiving the interchange electronic response advice message, update a transaction card record associated with the misplaced transaction card with a data element indicating the status of the misplaced transaction card as "found" or "returned;"
- receive, from the issuer, a second interchange electronic advice message conforming to ISO 8583, including message type indicator (MTI) 0600, the message including an indication that the misplaced transaction card has been returned to the cardholder; and
- in response to receiving the second interchange electronic advice message, update the transaction card record associated with the misplaced transaction card, including removing the data element.

6. The non-transitory computer-readable storage medium in accordance with claim 5, said computer-executable instructions causing the one or more processors to transmit the interchange electronic response advice message to the POS terminal associated with the merchant.

* * * * *